No. 682,485. Patented Sept. 10, 1901.
J. R. McWANE.
MOLDING APPARATUS.
(Application filed Apr. 30, 1901.)
(No Model.) 2 Sheets—Sheet 1.
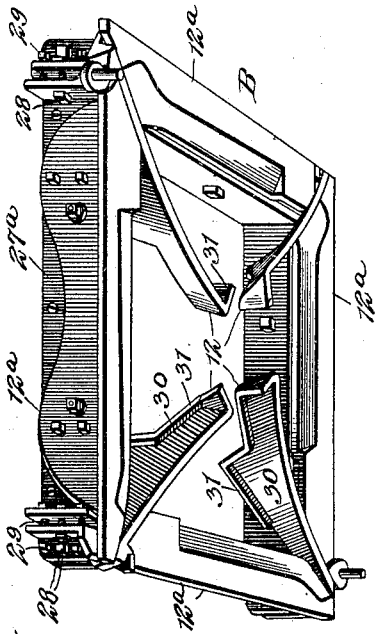
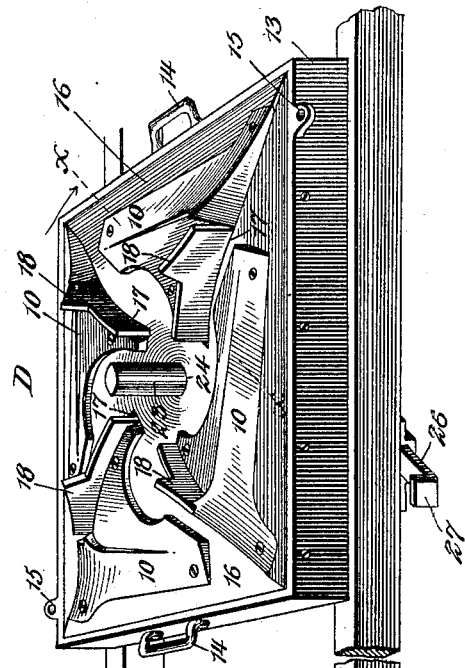
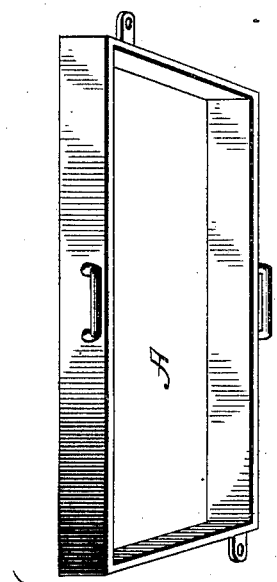
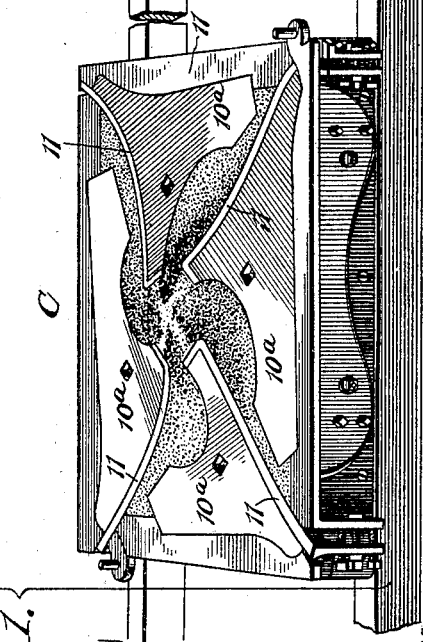
James R. McWane, Inventor;

No. 682,485.  
J. R. McWANE.  
MOLDING APPARATUS.  
(Application filed Apr. 30, 1901.)  
(No Model.)  
Patented Sept. 10, 1901.  
2 Sheets—Sheet 2.
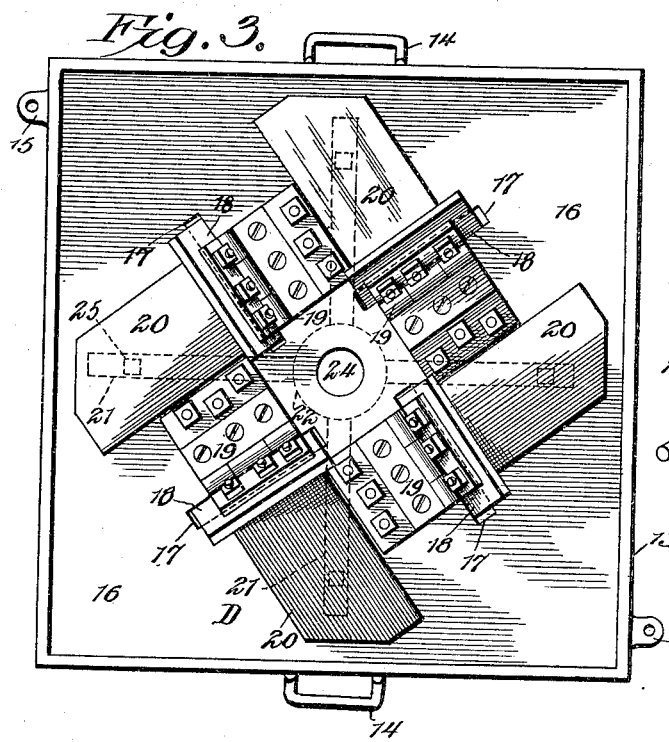
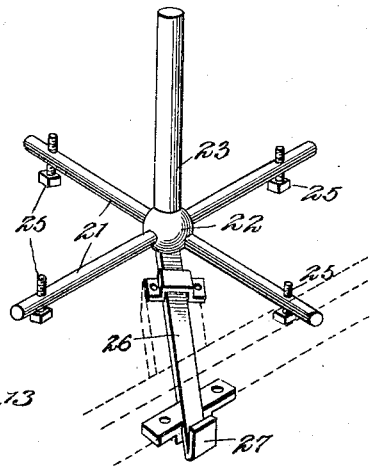
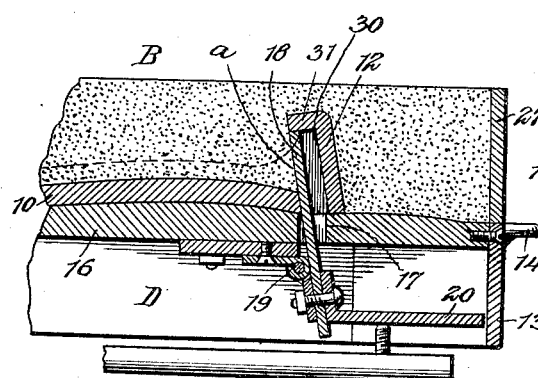
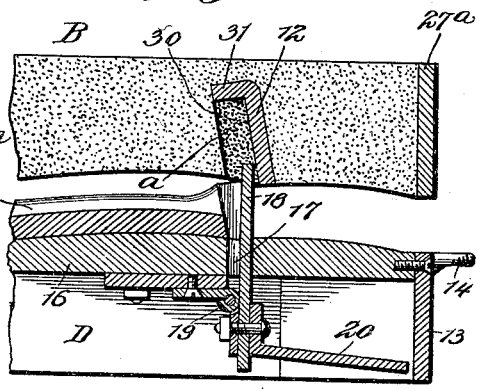
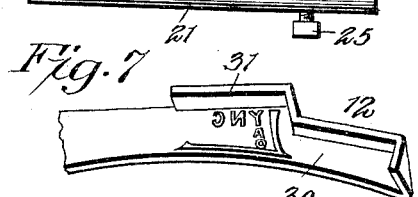
James R. McWane, Inventor:
Witnesses  
Howard W. Orr.

UNITED STATES PATENT OFFICE.

JAMES R. McWANE, OF LYNCHBURG, VIRGINIA.

MOLDING APPARATUS.

SPECIFICATION forming part of Letters Patent No. 682,485, dated September 10, 1901.

Application filed April 30, 1901. Serial No. 58,199. (No model.)

*To all whom it may concern:*

Be it known that I, JAMES R. McWANE, a citizen of the United States, residing at Lynchburg, in the county of Campbell and State of Virginia, have invented a new and useful Molding Apparatus, of which the following is a specification.

The present invention relates to molding apparatus, and while it is particularly applicable to molding plow points or shares it will be readily understood by those skilled in the art that it may be employed in making molded molds for casting many different articles. In order, however, that the invention may be readily understood, an embodiment is shown and described which is employed in making molds for plowshares.

Most plowshares as now constructed have one or more projections extending at less than right angles from the main body of the share, these projections serving as locks that engage over the edge of the moldboard or standard and assist the bolt in holding the share in place. It will be apparent that such locks increase the difficulty of molding, as each pattern must be drawn separately and at a certain angle in order to prevent tearing up the sand at the edges and making an imperfect mold, with a consequent worthless casting. In the various attempts that have been made to simplify the method of molding these inclined projections or locks have been serious obstacles. It has been the usual custom to make the patterns with "trimmings"—that is, the lock-patterns are separate pieces detachably held in place upon the main body by dowel-pins, enabling the molder to draw these parts separately. This is not only tedious, but requires time and skill—important factors in the production of castings at a low cost. Another plan has been to provide a match-plate carrying the body-pattern and provided with wings that extend through the match-plate to form the locks, said plates being slidable, so that they may be moved to an inoperative position before the flask is removed. While this overcomes some of the objections, there are certain serious drawbacks to the same, among which may be mentioned the constant friction caused by the wings sliding against the sand. This soon wears the wings down, causing the resultant locks to be imperfect.

It is the object of the present invention to overcome all the above objections by providing novel means of a simple character that will mold a perfect lock with speed, eliminating the necessity of skill, and enabling the workmen to make a number of molds simultaneously.

A very important and, as far as I am aware, novel result is also obtained by the present invention in that it permits the chilling of the entire exterior or working face of the lock and the placing of suitable marks or advertising matter thereon.

While it will be apparent that the construction for carrying out the invention is capable of many changes and modifications, that which is at present considered preferable is described in the following specification and shown in the accompanying drawings.

In said drawings, Figure 1 is a perspective view of the "drag" of a flask and the "match" employed in connection therewith. Fig. 2 is a similar view of the "cope" of the flask and the match therefor. Fig. 3 is a bottom plan view of the lower match, illustrating the manner of hinging the movable impression elements and showing the arrangement of the counterweights. Fig. 4 is a detail vertical sectional view through the cope and lower match-section when in coacting relation. This view is taken on the line X X of Fig. 2. Fig. 5 is a view similar to Fig. 4, but showing the cope and mold when lifted. Fig. 6 is a perspective view of the operating mechanism for the lock-molding elements. Fig. 7 is a detail perspective view of a chill, illustrating the manner in which advertising matter may be placed thereon.

Similar characters of reference designate like and corresponding parts in all the figures of the drawings.

Referring to Figs. 1 and 2, there is illustrated the drag and cope of a flask, which are designated, respectively, A and B. There is also shown the match members which coact with the flask-sections, the member employed with the drag being hereinafter termed the "lower" match member and designated C, while the other is termed the "upper" match member and designated D. These several members carry, respectively, the patterns 10 and 10ª, chill-prints 11, and chills 12 and 12ª. So far as thus described no claims are made to this construction, as it is fully set forth and claimed in another application made by me on January 9, 1901, Serial No. 42,667.

The present invention is shown as applied to the cope B and the upper match member D and in the present instance is as follows: The upper match member D comprises a rectangular frame or casing 13, having handles 14 and eyes 15. Secured to and within the upper edge of this casing is a bearing-plate 16, upon which are rigidly fastened a plurality of share-body patterns 10, which form the impressions in the cope of the under sides of said shares. The plate 16 is provided with a plurality of openings 17, which are located at what may be termed the "landside" edges of the patterns 10. Through these openings project the lock-patterns 18, that are pivoted to the under side of the plate by means of hinges 19. The projecting portions of these patterns are made in the proper form of the share-locks and are adapted to rest against the pattern-bodies 10 at the proper inclinations at which the locks will be made. Under normal conditions or when in inoperative position each lock-pattern assumes a vertical position, as shown in Fig. 5, and in order to accomplish this said patterns are each provided with a counterbalance in the form of an offset arm 20.

In the present construction four share-patterns are illustrated, each having a lock-pattern, and common means is provided for holding all of said lock-patterns in operative positions. This means is clearly shown in Fig. 6. A pair of cross-rods 21 are secured to an enlarged circular head 22, that is located on the lower end of a vertical operating-stem 23, which is slidably mounted in a central opening 24 in the bearing-plate 16. The rods 21 are each located below one of the offset weights 20 and carry adjusting-screws 25, that are arranged to contact with said weights when the stem is raised to move the lock-patterns to operative position. Suitable means are provided for positively locking the stem in raised position, said means being preferably in the form of a sliding bolt 26, mounted upon the supporting-frame, the outer end of said bolt having a handle 27, while the inner end is adapted to slide beneath the head 22 when the latter is elevated, and because of the contour of said head the bolt will wedge the same tightly in raised position.

In connection with the above-described mechanism the cope B of the flask is employed, which consists of the rectangular boxing 27ª, carrying the chill-sections 12 and 12ª. The chill-sections 12 are adjustably secured at their outer ends to the walls of the cope by means of the tie-bolts 28 and set-screws 29. These sections are located within the cope, and the upper edges of the operative faces 30, as well as the inner ends, are provided with the offset flanges 31. The faces 30 may also be provided with suitable legends, trade-marks, or other symbols, as clearly indicated in Fig. 7, these marks being reversely formed, so that they will properly appear on the cast article.

In using the device the lock-patterns are moved to and held in their operative positions, and the cope is then placed upon the match. The chills 12 will thereupon be located over the said lock-patterns and will leave a free space behind the same, as clearly shown in Fig. 4. The sand is then placed in the cope, which is rammed up in the usual manner. After this is accomplished the holding-rods are dropped, thus releasing the lock-patterns and permitting them to move over against the face of the chill. In this position they will clear the inclined wall of sand, (marked $a$ in Figs. 4 and 5,) and as the mold is removed the counterweights will hold said lock-patterns against the chills, as clearly shown in Fig. 5.

The advantages of this construction and combination are many. In the first place it permits the rapid and accurate molding of points or shares of this character without the necessity of any special skill and in a minimum amount of time. It embodies the important features of the match members and flask-chills as brought out in the above-mentioned application. Further than this the chills carried by the flask member form casings that cover the lock-patterns with the exception of their working faces, which faces have no frictional movement against the sand, but are carried directly away from it. Another feature resides in the operating-stem 23, which not only serves as means for moving the lock-patterns to their operative positions, but also forms the sprue-hole or gate in the cope, thus doing away with the necessity of an extra tool for this purpose.

Another and exceedingly important advantage results from this structure in that the chills 12 cover the entire outer faces of the lock-molds, as is shown in cross-section in Fig. 5, and therefore the entire faces of the locks are chilled. As these faces are subjected to considerable wear, it will be seen that their wearing qualities will be greatly prolonged. Another advantage resides in the fact that suitable advertising matter can be placed upon the inner side of the chills, as shown in Fig. 7, and the same will appear on the castings at a point that is conspicuous. This can be accomplished for the reason that said chill does not have to be drawn from the sand, and while matter of this kind has heretofore been placed upon these castings it has always been necessary to have it on the under sides, where it is never seen except during the attachment or removal of said castings.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In molding apparatus, the combination with a pattern member, of a flask member arranged to be placed in coacting relation with the pattern member, an impression element movably mounted upon the pattern member, and a casing carried by the flask member and arranged to fit over the impression element when the pattern and flask members are in coacting relation to hold the molding material from contact with certain portions of the impression element.

2. In molding apparatus, the combination with a pattern member, of a flask member arranged to be placed in coacting relation with the pattern member, an impression element movably mounted upon the pattern member, and a chill arranged to be placed over the impression element to hold the molding material from contact with certain portions thereof, said chill being removable from the movable impression element.

3. In molding apparatus, the combination with a pattern member, of a flask member arranged to be placed in coacting relation with the pattern member, an impression element movably mounted upon the pattern member, and a chill carried by the flask member and arranged to fit over the impression element when the pattern member and flask member are in coacting relation to hold the molding material from contact with certain portions of said impression element.

4. In molding apparatus, the combination with a pattern member, of a flask member arranged to be placed in coacting relation with the pattern member, an impression element movably mounted upon the pattern member, and a chill carried by the flask member and arranged to fit over the impression element when the pattern member and flask member are in coacting relation to hold the molding material from contact with certain portions of said impression element, said chill and impression element having their adjacent faces spaced from each other to permit the movement of the latter toward the former.

5. In molding apparatus, the combination with a pattern member, of a flask member arranged to be placed in coacting relation with the pattern member, an impression element pivotally mounted upon the pattern member, and a chill carried by the flask member and arranged to fit over the impression element when the pattern and flask members are in coacting relation to hold the molding material from contact with certain portions of the impression element.

6. In molding apparatus, the combination with a pattern member, of a flask member arranged to be placed in coacting relation with the pattern member, an impression element pivotally mounted upon the pattern member, and a chill carried by the flask member and having offset flanges arranged to fit over the impression element to hold the molding material from contact with certain portions thereof, said chill and impression element having adjacent faces spaced from each other to permit the movement of the latter toward the former.

7. In molding apparatus, the combination with a pattern member carrying a plurality of patterns, of a flask member arranged to be placed in coacting relation with the pattern member, a plurality of impression elements pivotally mounted upon the pattern member, and a plurality of chills carried by the flask member and arranged to fit over the impression elements when the flask and pattern members are in coacting relation to hold the molding material from contact with certain portions of said impression members.

8. In molding apparatus, the combination with a pattern member carrying a plurality of patterns, of a flask member arranged to be placed in coacting relation with the pattern member, a plurality of impression elements pivotally mounted upon the pattern member, a plurality of chills carried by the flask member and arranged to fit over the impression elements when the flask and pattern members are in coacting relation to hold the molding material from contact with certain portions of said impression members, and common means for holding the impression elements against movement.

9. In molding apparatus, the combination with a pattern member carrying a plurality of patterns, of a flask member arranged to be placed in coacting relation with the pattern member, a plurality of impression elements pivotally mounted upon the pattern member, and a plurality of chills adjustably secured to the flask member and arranged to fit over the impression elements when the flask and pattern members are in coacting relation to hold the molding material from contact with certain portions of said impression members.

10. In molding apparatus, the combination with a pattern member carrying a plurality of patterns, of a flask member arranged to be placed in coacting relation with the pattern member, a plurality of impression elements pivotally mounted upon the pattern member, and a plurality of chills adjustably secured at their outer ends to the flask member and projecting inwardly within the same, said chills being arranged to fit over the impression elements when the flask and pattern members are in coacting relation to hold the molding material from contact with certain portions of said impression members.

11. In molding apparatus, a match-section, an impression element movably mounted upon the match-section, and means for moving the impression element, said means including a stem projecting above the operative face of the match-section and constituting a gate-molding device.

12. In molding apparatus, a match-section having a plate which is provided with an opening, an impression element pivoted to the under side of the plate and projecting through the opening, a movable operating-stem extending through the plate and projecting from the same face thereof as the impression element, and a connection between the stem and the portion of the movable impression element that is located beneath the plate.

13. In molding apparatus, a match-section having a plate which is provided with an opening, an impression element pivoted to the under side of the plate and projecting through the opening, a movable operating-stem extending through the plate and projecting from the same face thereof as the impression element, and an adjustable connection between the same and a portion of the movable impression element which is located beneath the plate.

14. In molding apparatus, a match-plate carrying a pattern on its upper face and provided with an opening, an impression element pivoted to the under side of the plate and passing through the opening thereof, and a counterweight secured to the impression element beneath the match-plate and arranged to urge said element to an upright position.

15. In molding apparatus, a match-plate carrying a pattern on its upper face and provided with an opening, an impression element pivoted to the under side of the plate and passing through the opening thereof, a counterweight secured to the impression element beneath the match-plate and arranged to move said element to an upright position, and means adapted to engage the counterweight to hold the impression element at an inclination to the pattern.

16. In molding apparatus, a match-plate carrying a pattern on its upper face and provided with an opening, an impression element pivoted to the under side of the plate and passing through the opening thereof, a counterweight secured to the impression element beneath the match-plate and arranged to move said element to an upright position, and adjustable means adapted to engage the counterweight to hold the impression element at an inclination to the pattern.

17. In molding apparatus, a match-plate carrying a pattern on its upper face and provided with an opening, an impression element pivoted to the under side of the plate and passing through the opening, a counterweight secured to the impression element beneath the match-plate and arranged to move said element to an upright position, a stem projecting through the plate, and means carried by the lower portion of the stem and adapted to engage the counterweight to hold the impression element at an inclination to the pattern.

18. In molding apparatus, a match-plate carrying a pattern on its upper face and provided with an opening, an impression element pivoted to the under side of the plate and passing through the opening, a counterweight secured to the impression element beneath the match-plate and arranged to move said element to an upright position, a stem projecting through the plate, and adjustable means carried by the lower portion of the stem and adapted to engage the counterweight to hold the impression element at an inclination to the pattern.

19. In molding apparatus, a match-plate carrying a plurality of patterns on its upper face and provided with openings contiguous to the patterns, impression elements pivoted to the under side of the plate and passing through the openings thereof, counterweights secured to the impression elements beneath the plate to move said elements to upright positions, a stem projecting through the plate, and means carried by the lower portion of the stem and adapted to engage the counterweights to hold each impression element at an inclination to the adjacent pattern.

20. In molding apparatus, a match-plate carrying a plurality of patterns on its upper face and provided with openings contiguous to the patterns, impression elements pivoted to the under side of the plate and passing through the openings thereof, counterweights secured to the impression elements beneath the match-plate and arranged to move said elements to upright positions, a slidable stem projecting through the plate and carrying radiating arms located beneath the counterweights, and adjusting-screws carried by the arms and arranged to engage said counterweights when the stem is raised.

21. In molding apparatus, a match-plate carrying a plurality of patterns on its upper face and provided with openings contiguous to the patterns, impression elements pivoted to the under side of the plate and passing through the openings thereof, counterweights secured to the impression elements beneath the match-plate and arranged to move said elements to upright positions, a slidable stem projecting through the plate and carrying radiating arms located beneath the counterweights, adjusting-screws carried by the arms and arranged to engage said counterweights when the stem is raised, and means for holding the stem in raised position.

22. In molding apparatus, a match-plate carrying a plurality of patterns on its upper face and provided with openings contiguous to the patterns, impression elements pivoted to the under side of the plate and passing through the openings thereof, counterweights secured to the impression elements beneath the match-plate and arranged to move said elements to upright positions, a slidable stem projecting through the plate and carrying radiating arms located beneath the counterweights, adjusting-screws carried by the arms and arranged to engage said counterweights when the stem is raised, and a sliding bolt adapted to bear against the lower end of the stem to hold the stem in raised position.

23. In plow-molding apparatus, the combination with a pattern member having a stationary pattern-section and a movable pattern-section coacting therewith, of a flask arranged to be placed in coacting relation with the pattern member, and a chill coacting with the movable pattern-section when the flask is in place upon the pattern member.

24. In plow-molding apparatus, the combination with a plowshare-pattern comprising a stationary body-section and a movable lock-section, of a flask arranged to be placed in coacting relation with the pattern, and a chill secured to the flask and located adjacent to the movable lock-section when the flask is in said coacting relation, said chill constituting a portion of the wall of the lock-mold made in the flask.

In testimony that I claim the foregoing as my own I have hereto affixed my signature in the presence of two witnesses.

JAMES R. McWANE.

Witnesses:
W. G. STEVENS,
H. W. STEVENS.